United States Patent
Gibson et al.

[11] Patent Number: 5,957,196
[45] Date of Patent: Sep. 28, 1999

[54] APPARATUS FOR ENHANCED BIOREMEDIATION OF UNDERGROUND CONTAMINANTS

[75] Inventors: Thomas Loughborough Gibson, Utica; Abdul Shaheed Abdul, Troy, both of Mich.

[73] Assignee: General Motors Corporation, Detroit, Mich.

[21] Appl. No.: 08/953,674

[22] Filed: Oct. 17, 1997

[51] Int. Cl.⁶ ............................ E21B 27/00
[52] U.S. Cl. .............. 166/163; 166/165; 405/66; 405/128
[58] Field of Search .................. 166/162, 163, 166/165, 246; 405/8, 66, 128

[56] References Cited

U.S. PATENT DOCUMENTS

| | | | |
|---|---|---|---|
| 5,111,883 | 5/1992 | Savery | 166/269 |
| 5,221,159 | 6/1993 | Billings et al. | 405/128 |
| 5,332,333 | 7/1994 | Bentley | 405/128 |
| 5,360,067 | 11/1994 | Meo III | 166/256 |
| 5,402,848 | 4/1995 | Kelly | 166/266 |
| 5,425,268 | 6/1995 | Li et al. | 73/19.1 |
| 5,441,365 | 8/1995 | Duffney et al. | 405/128 |
| 5,520,483 | 5/1996 | Vigneri | 405/128 |
| 5,543,623 | 8/1996 | Everett et al. | 250/390.04 |
| 5,553,189 | 9/1996 | Stegemeier et al. | 392/422 |
| 5,577,558 | 11/1996 | Abdul et al. | 166/246 |
| 5,686,299 | 11/1997 | Colwell et al. | 435/287.1 |
| 5,690,173 | 11/1997 | Abdul et al. | 166/268 |
| 5,891,711 | 4/1999 | Carter | 435/299.1 |

*Primary Examiner*—Roger Schoeppel
*Attorney, Agent, or Firm*—George A. Grove

[57] ABSTRACT

A tall cylindrical silicone rubber gas permeable tube is adapted to fit in an injection well at least partly below the water table for the bioremediation of organic contaminants and to contain pressurized oxygen and/or other gases supportive of the anaerobic micro-organism activity. The gases slowly diffuse through the bladder at rates that permit their full utilization by dissolution in the underground water.

10 Claims, 2 Drawing Sheets

APPARATUS FOR ENHANCED BIOREMEDIATION OF UNDERGROUND CONTAMINANTS

TECHNICAL FIELD

This invention relates to the bioremediation of organic contaminants in the soil and ground water. More specifically, this invention relates to an improved apparatus for the introduction of oxygen and other gases into ground water to support the bioremediation of such contaminants.

BACKGROUND OF THE INVENTION

U.S. patent application Ser. No. 08/805481, filed Feb. 25, 1997, now U.S. Pat. No. 5,690,173 assigned to the assignee of the subject patent application, describes a practice and apparatus for introducing gases into ground water to provide oxygen for the aerobic decomposition of organic contaminants. It is well known that naturally occurring micro-organisms resident in an underground formation can metabolize and thereby degrade organic material to carbon dioxide and water. While the organisms may be aerobic or anaerobic, the aerobic organisms are most effective in degrading gasoline and oil spills. Such micro-organisms can be employed to decompose an organic contaminant in a reasonable period of time provided that sufficient oxygen can be supplied to the working organisms.

The above patent application discloses the use of one or more wells drilled to a level below the table of the contaminated water. Where two wells are used, one well may be used as a recovery well and the other as an injection well. The recovery well is used to remove some of the contaminated water for analysis and/or treatment. Obviously, it is desirable to fully analyze samples withdrawn from a recovery well to ascertain the extent of the contamination and the progress achieved in its remediation. Such analysis enables a strategy to be developed to complete the remediation process. The existence of a recovery well also permits the use of ground-water treatment materials and devices above ground such as for the removal of chemical species that may plug the wells or otherwise interfere with the remediation treatment.

An injection well is used to return treated water and other materials to the contaminated subsurface formation. In accordance with the above-identified patent application, an injection well is also used to inject air or, preferably, oxygen into the water to support aerobic micro-organisms as they metabolize the organic contamination. In one form such an injection well included an outer pipe that was perforated, at least in the portion extending below the water table, and an inner pipe for introducing treated water, for example, back into the formation. Extending down from the surface and coiled around the inner or outer pipe was a polymeric hose for dispersing and dissolving molecular oxygen into the underground water. The hose was of suitable composition to hold oxygen gas under pressure and to permit the diffusion of oxygen molecules through the wall of the hose into the micro-organism bearing contaminated water and soil. By such means the oxygen was supplied slowly in amounts soluble in the water. Thus, the oxygen that was introduced into the formation could be dissolved in the groundwater to be utilized by the micro-organisms and not wasted by bubbling out of the region. Optionally, other nutrient gases may be supplied with the oxygen for remediation.

A suitable rubber or plastic hose, such as a silicone rubber hose, serves very well to oxygenate a contaminated region of anaerobic organisms. One end of the hose is closed. A high pressure source of oxygen is connected to the other end to deliver oxygen through the hose to the micro-organisms in the water or nearby soil. The combination of a recovery well and an injection well can be used to induce or assure a flow of water at a suitable rate past the oxygenation hose. The length of the coiled hose can be determined to provide enough diffusion area through the hose to provide a desired oxygen flow into the formation.

While the coiled diffusion hose works very well in many applications, there are applications where a simpler, lower maintenance, more versatile apparatus would be useful. It is an object of this invention to provide such a diffusion apparatus for bioremediation.

SUMMARY OF THE INVENTION

This invention provides an elongated, straight diffusion tube, bladder or balloon adapted to fit vertically in a well or soil bore hole. Generally and preferably, a tube will be used that has the configuration of a tall, relatively small diameter can. The bottom end of the tube will preferably be closed. The top end of the cylindrical tube will also be closed. However, the top end is preferably provided with a valve to admit and retain a charge of oxygen and, optionally, other nutrient gases for remediation.

There are several polymeric materials that permit the diffusion of oxygen at rates that do not exceed the solubility of the gas in water. However, silicone rubbers provide a higher diffusion rate for both oxygen and other gases useful in remediation processes such as methane, ethane, ethylene, ammonia, nitrous oxide or triethylphosphate. Transparent or semi-transparent silicone tubing (e.g., one to four inches in diameter) is preferred for use in this invention because it fits the inner diameter of most well pipes.

In many embodiments of the invention, it will be desired to fill the tube with a gas under a pressure of 60 to 100 pounds per square inch gage. In this way, the container can be charged at one time with an amount of gas that will take a day or more to diffuse through the polymeric wall of the container. Thus, the silicone tube may require reinforcement. Silicone rubber tubing with braided fiber reinforcement is commercially available and suitable for use. In other embodiments, the bladder is supported within a perforated tube that is inserted in the gas insertion well.

Thus, in practice a gas insertion well is drilled in a region where it is desired to efficiently introduce a gas to support bioremediation. The well or bore is deep enough to reach a level below the water table so that the gas, usually oxygen, diffuses into the water. Although it is not necessarily part of this invention, a nearby recovery well may also be drilled to promote suitable water flow past the injection tube.

These and other objects and advantages of the subject invention will become more apparent from a detailed description thereof which follows. Reference will be had to the drawings which are described immediately below.

DESCRIPTION OF THE PREFERRED EMBODIMENT

Figure 1:
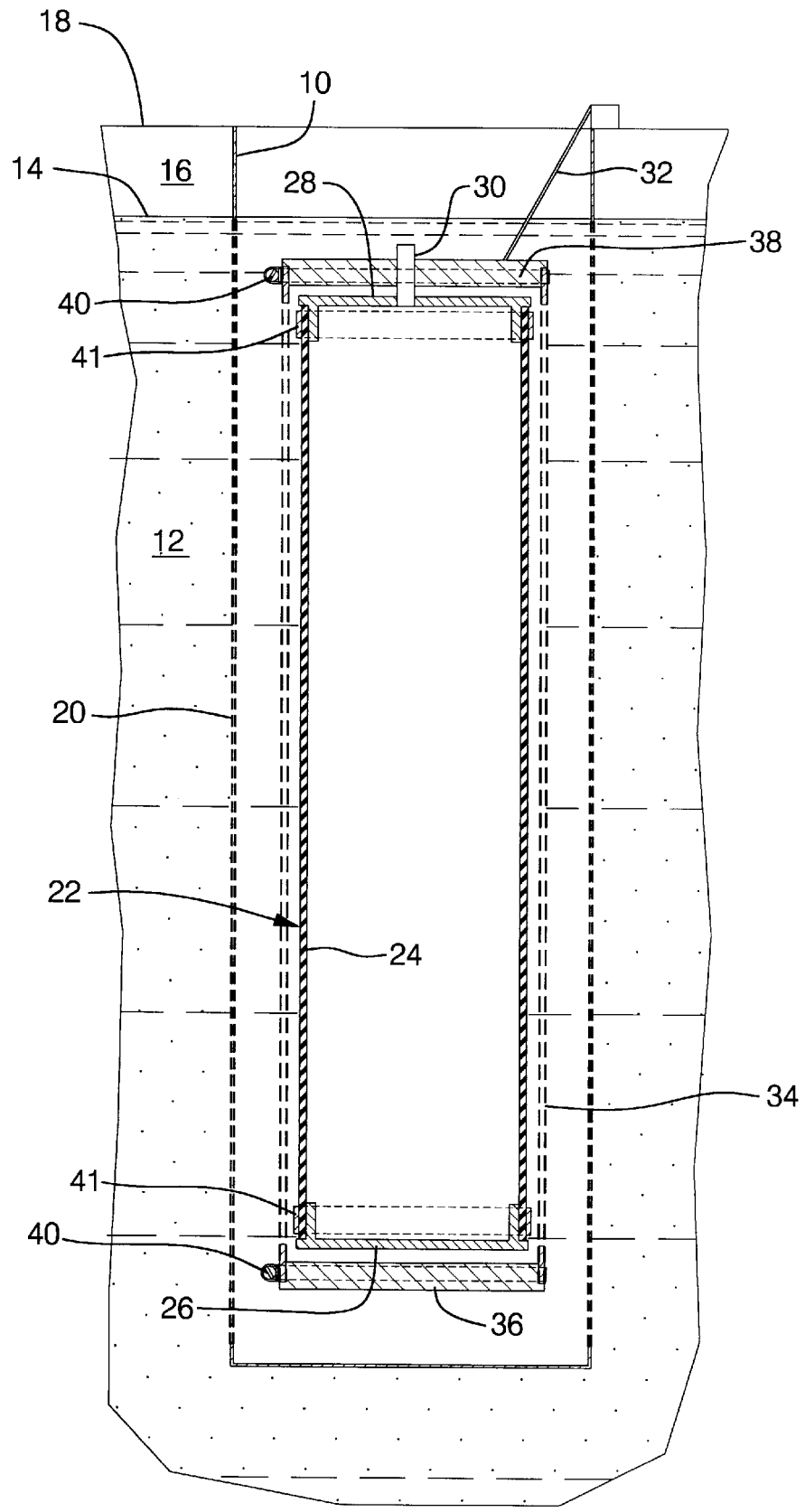
FIG. 1 is a sectional view of a gas injection well with a first embodiment of a gas injection tube of the subject invention in place.

FIG. 1 illustrates one preferred embodiment of the invention. A well or borehole with a perforated liner has been made in a region that has been contaminated by a spill or leak of a petroleum product such as motor oil, transmission oil or gasoline. The well has been drilled in a formation 12 in which the soil contains groundwater within a few feet of the surface. The water table is indicated at 14. The soil 16 above the water level 14 may contain some water. The surface is indicated at 18. The region below water table 14, of course, comprises soil saturated with water and containing organic material. The region also contains many different types of naturally occurring bacteria, some of which are capable of consuming the foreign organic material. Usually such bacteria require a supply of oxygen to metabolize the oil—typically three to four times the weight of the contaminant to be consumed. Therefore, it is necessary to inject oxygen into the soil and water if the effort of the natural organisms is to proceed at any practical rate. Further the oxygen, or other remediation assisting gas, must be introduced in an amount that can be dissolved in the water if it is not to simply bubble up out of the ground.

As seen in FIG. 1, a gas injection device 22 is placed in the well liner 20 to contain oxygen or other gas under pressure as it permeates from the device 22 into the water. The body of the device is preferably a tube or hose 24, preferably of silicone rubber. Silicone tubing and hose, reinforced and unreinforced, is commercially available. Such hose is available, for example, from Pure Fit, Inc., Allentown, Pa. under the trade designation SMP Hose. SMP Hose is extruded tubes of platinum-cured silicone rubber. The hose is cloudy, nearly transparent and is reinforced with four-ply wrapped Nomex aramid fiber. The hose is formed by extruding a first tube over which an aramid fiber wrap or braid is applied. An outer tube is applied over the wrapped inner tube. A hose of one to three and one-half inch internal diameter is suitable for application in this invention depending upon the desired inner diameter of the well. The thickness of the wall including reinforcement is typically about 0.4 inch. The tube 24 is shown suspended in well 10.

The tubing 24 is cut to a desired length for treatment of the ground water in a specific application. The tubing ends are sealed with suitable end caps. The lower end of tube 24 is sealed with end cap 26 and clamp 41, and the upper end is closed with a cap 28, clamp 41 and valve 30 (shown closed) for filling with oxygen or other remediation enhancing gas.

If tube 24 does not contain internal reinforcement (or if additional support is desired), it may be enclosed in a flexible or rigid porous supporting mesh 34 with end caps 36 (lower) and 38 (upper) with clamps 40. Fastened to upper end cap 38 is a support line 32 for suspending the tube at a desired depth in the well 10. Mesh 34 can be used to place the hollow injection device 22 in the well. The mesh 34 can be weighted by means not shown to help sink the injection device 22 and then to provide support against the high pressure to which the tube 24 will be subjected. The mesh 34 may be formed of metal such as copper or brass or of a suitable polymer. The use of a copper containing alloy can provide protection against fouling of the gas injection site by bacteria.

When the gas injection device is in place in the well liner 20, the tube 24 can be evacuated of air. Then one or more gases are introduced into the tube under pressure. Oxygen is introduced at a pressure of 40 to 100 psig for aerobic bacterial activity. Methane, ethane or ethylene and oxygen are supplied in combination to increase the methanotropic bioremediation of chlorinated compounds including trichloroethene, dichloroethene and vinyl chloride. Ammonia and nitrous oxide are used as nutrients to supply nitrogen for bacterial growth to promote biodegradation processes. To a similar purpose, triethylphosphate vapor can be used to supply phosphorus. With the exception of ammonia, the above-named gases have limited solubility in groundwater and the use of the subject apparatus permits the slow, efficient diffusion of the gases from the silicone tube into the water in amounts that can be dissolved.

Diffusion rates of 0.6 g/day to 3.7 g/day per foot of length through a silicone rubber tube have been measured to demonstrate the utility of the subject apparatus. A silicone rubber tube one foot in length with a 1.5 inch inside diameter and a 0.25 inch wall thickness was tested in 1.2 liter closed recirculating water bath. The tube was pressurized with oxygen at pressures from 35 psig to 100 psig. Dissolved oxygen concentration in the water was measured to determine the rate of oxygen transfer through the tubing or bladder wall. The results are shown in the following table.

| Applied Pressure (psig) | Total Oxygen Capacity (g) | Diffusion Rate (mg/day) | $K_p$ (barrer)* |
|---|---|---|---|
| 35 | 33 | 562 | 160 |
| 58 | 54.6 | 1579 | 210 |
| 100 | 94 | 3696 | 272 |

*1 barrer = $1 \times 10^{-10}$ mL/(s cm cm$^2$cm Hg)

The diffusion rate, J, of gases through membranes can be calculated using Fick's Law: $J = K_p \times$ pressure gradient. In principle, the diffusivity constant, $K_p$, is independent of pressure. However, in the above experiment $K_p$ increased as the pressure on the tube increased. This may have resulted from the fact the tube expanded as the pressure increased and the diffusion area increased rather than the diffusivity value. In any event the delivery rate of a gas utilizing the subject apparatus is readily controlled by controlling the pressure of the gas inside the bladder.

Figure 2:
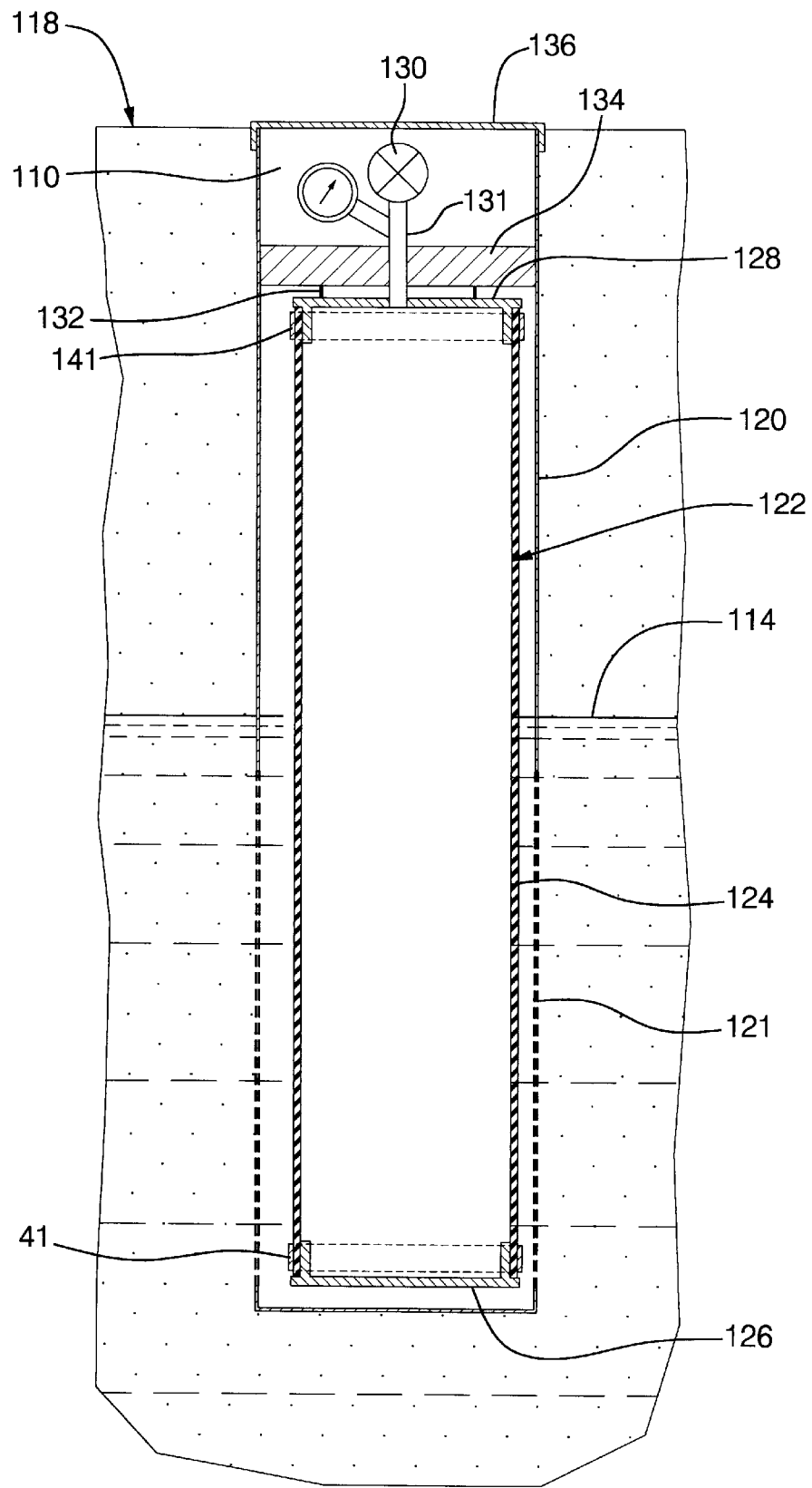
FIG. 2 is a sectional view of a gas injection well with a second embodiment of a gas injection tube of the subject invention in place.

FIG. 2 shows a second preferred embodiment of the apparatus 122 of this invention.

In FIG. 2, a combination of well pipe 120 and well screen 121 is used as support for the inflated oxygen injection device 122. The spacing between device 122 and the well pipe 120 and screen 121 is exaggerated for clarity of illustration. The tube 124, end caps 126, 128 and clamps 141 assembly is inserted in the well pipe 120 and well screen 121 before the tube 124 is inflated. Only about half of the tube 124 extends below the water table 114, and most of the oxygen diffusion occurs through the portion of the tube within the well screen 121. Inflation of the tube through valve 130 and refill pipe 131 expands the tube 120 and forces it out against well pipe 120 and screen 121. Since the well pipe is not perforated, oxygen diffusion is retarded in that region of the bladder. The portion of the bladder contained within the well pipe can be formed of a lower cost material that is less permeable to the oxygen or other remediation assisting gas.

Well pipe 120 contains a removable sealer cap 134 with suspending wires 132 for injection apparatus 122. The top of the well 110 is closed with a flush mounted well cap 136 at ground level 118.

In the preferred embodiments described, the gas introduction apparatus has included a fabric-reinforced silicone rubber (or other suitable polymeric) gas-permeable tube fitted with suitable end closures. Obviously, other gas container structures could be employed. Instead of a tube, a long cylindrical bag or bladder could be used where the bottom is integral with the walls. The bag may be blow molded, e.g., like a bottle so that only a small closure and valve need be applied. Other structures may also be used.

While the invention has been described in terms of specific embodiments thereof it will be apparent that other forms could readily be adapted by one skilled in the art. Accordingly, the scope of the invention is to be limited only by the following claims.

We claim:

1. Apparatus for introducing a bioremediation assisting gas into a well drilled in the earth into below-the-surface water contaminated with biodegradable chemicals, said well having a diameter to receive said apparatus, said apparatus comprising a straight wall polymeric container having an internal diameter and, when disposed vertically in said well, a lower end and an upper end, said container having an internal diameter greater than the thickness of said wall, said container being of a composition permitting diffusion of a said gas through said wall and the internal volume of said container being sufficient to hold a volume of said gas under pressure that would require more than one day to diffuse through the wall, the top and bottom ends of said container being closed and the top end having a valve for admitting a gas into said tube.

2. An apparatus as claimed in claim 1 in which said container is formed of a silicone rubber.

3. An apparatus as recited in claim 1 in which reinforcing means is placed in said well and positioned to be engaged by a said container when inserted in said well and pressurized by a said gas.

4. Apparatus for introducing a bioremediation assisting gas into a well drilled in the earth into below-the-surface water contaminated with biodegradable chemicals, said well having a diameter for receiving said apparatus, said apparatus comprising a straight polymeric tube having a wall, an internal diameter and, when disposed vertically in said well, a lower end and an upper end, said tube having an internal diameter greater than the thickness of said wall, said tube being of a composition permitting diffusion of a said gas through said wall and the internal volume of said tube being sufficient to hold a volume of said gas under pressure that would require more than one day to diffuse through the wall, the top and bottom ends of said tube being closed and the top end having a valve for admitting a gas into said tube.

5. An apparatus as recited in claim 4 in which said tube comprises a circumferential reinforcing fabric to strengthen the tube against the pressure of a said gas.

6. An apparatus as recited in claim 5 in which said fabric is located on the outer surface of said tube.

7. An apparatus as recited in claim 5 in which said fabric is located in the wall of said tube.

8. An apparatus as recited in claim 5 in which said reinforcing fabric is a polyaramid fabric.

9. An apparatus as claimed in claim 4 in which said tube is formed of a silicone rubber.

10. An apparatus as recited in claim 4 in which reinforcing means is placed in said well and positioned to be engaged by a said tube when inserted in said well and pressurized by a said gas.

* * * * *